United States Patent
Kawamura et al.

(10) Patent No.: US 6,736,499 B2
(45) Date of Patent: May 18, 2004

(54) INK SET FOR INK-JET RECORDING

(75) Inventors: Masateru Kawamura, Toyoake (JP); Naomichi Kobayashi, Nagoya (JP); Hideo Ohira, Tajimi (JP); Shunichi Higashiyama, Yotsukaichi (JP); Masaya Fujioka, Nagoya (JP)

(73) Assignee: Brother Kogyo Kabushiki Kaisha, Aichi-ken (JP)

(*) Notice: Subject to any disclaimer, the term of this patent is extended or adjusted under 35 U.S.C. 154(b) by 0 days.

(21) Appl. No.: 10/233,103

(22) Filed: Aug. 30, 2002

(65) Prior Publication Data

US 2003/0067526 A1 Apr. 10, 2003

(30) Foreign Application Priority Data

Aug. 31, 2001 (JP) ........................................ 2001-263966

(51) Int. Cl.[7] .................................................. B41J 2/01
(52) U.S. Cl. ...................... 347/100; 347/95; 106/31.13; 106/31.27
(58) Field of Search ............................ 347/100, 95, 96, 347/101; 103/31.13, 31.27, 31.28, 31.6

(56) References Cited

U.S. PATENT DOCUMENTS

| 5,380,358 A | * | 1/1995 | Aoki et al. ................. 347/100 |
| 5,428,383 A | | 6/1995 | Shields et al. |
| 5,518,534 A | * | 5/1996 | Pearlstine et al. ........... 347/100 |
| 5,849,815 A | * | 12/1998 | Aoki et al. ............... 106/31.49 |
| 6,022,908 A | * | 2/2000 | Ma et al. ................. 106/31.28 |
| 6,036,759 A | * | 3/2000 | Wickramanayake et al. ........................ 106/31.28 |
| 6,247,808 B1 | * | 6/2001 | Ma et al. ..................... 347/100 |

FOREIGN PATENT DOCUMENTS

| EP | 0-586-079 B1 | 5/1997 |
| JP | 6-106841 | 4/1994 |

* cited by examiner

*Primary Examiner*—Stephen D. Meier
*Assistant Examiner*—Manish Shah
(74) *Attorney, Agent, or Firm*—Reed Smith LLP

(57) ABSTRACT

An ink set for ink-jet recording is provided, in which the color bleed is reduced at adjoining portions of inks and the deposition of dye or the like in a color ink is not caused when a plurality of colors are recorded on regular paper. The ink set for ink-jet recording, which is composed of inks of a plurality of colors, includes at least one first ink and at least one second ink having the following compositions respectively. The first ink contains at least one anionicity-added pigment. The second ink contains at least one anionic dye and at least one ethanolamine hydrochloride selected from the group consisting of monoethanolamine hydrochloride, diethanolamine hydrochloride, triethanolamine hydrochloride, and thioethanolamine hydrochloride.

20 Claims, 3 Drawing Sheets

INK SET FOR INK-JET RECORDING

BACKGROUND OF THE INVENTION

1. Field of the Invention

The present invention relates to an ink set for ink-jet recording to be used for a color ink-jet recording system, and to a ink-jet recording apparatus.

2. Description of the Related Art

The ink discharge system, which has been hitherto known as the ink-jet recording system, includes, for example, the electrostatic attraction system, the system in which mechanical vibration or displacement is applied to the ink by using a piezoelectric element or the like, and the method in which bubbles are generated by heating the ink to utilize the pressure generated thereby. Ink droplets are formed by means of the ink discharge system as described above, and all or a part of the ink droplets are adhered to a recording objective such as paper to perform the recording. Those known and used as the ink for ink-jet recording to be employed for the ink-jet recording system as described above include those in which a variety of water-soluble dyes or water-dispersible pigments are dissolved or dispersed in liquid media each comprising water or a combination of water and water-soluble organic solvent.

In order to adequately perform the recording for a long period of time by using the ink for ink-jet recording, for example, it is necessary to satisfy the following conditions. That is, the characteristic values including, for example, the viscosity, the surface tension, the electric conductivity, and the density of the ink for ink-jet recording to be used are appropriate values. The recorded image is excellent, for example, in water resistance and light resistance. In order to avoid any clog-up at the nozzle or the orifice of the recording apparatus, no deposited matter is generated and no physical property value is changed by the influence of heat or the like. A large number of suggestions have been made in order to satisfy the conditions as described above. For example, in order to avoid the clog-up at the nozzle or the orifice, a water-soluble organic solvent is generally added.

In order to obtain good printing qualities, exclusive ink-jet paper is sometimes used. However, in recent years, it is more demanded to perform the recording on the regular paper rather than the recording on the exclusive ink-jet paper, in view of the cost and the consideration of the environment. When the recording is performed on the regular paper with a plurality of conventional color inks, the following problem arises. That is, the color bleed is apt to occur, which is caused such that the inks of different colors are mixed with each other at portions at which the inks of different colors are adjacent to one another. As a result, the printing qualities are deteriorated. The blurring tends to be conspicuous at the ink boundary, for example, especially when letters or characters are recorded with a black ink having a relatively dark color on the background of a color ink having a relatively bright color such as yellow, magenta, or cyan.

In recent years, the black ink is progressively improved, for example, such that the pigment is used in order to vividly print letter portions. On the contrary, a problem has arisen as follows. That is, the blurring at the boundary is more conspicuous than before due to the high concentration of the letter portion and the vivid contrast.

In order to solve the problem as described above, a method is disclosed in Japanese Patent Application Laid-open No. 6-106841, in which a polyvalent metal salt is added into a color ink to aggregate an anionicity-added pigment in a black ink thereby so that the color bleed, which occurs when the black ink and the color ink are subjected to the recording adjacently, is reduced. However, if the polyvalent metal salt is added to the color ink in order to reduce the color bleed, a new problem arises such that the selection of the dye is restricted, because the dye, which is added into the color ink, is deposited in some cases. The deposition of the dye is conspicuous especially when the anionic dye is used. Further, as for a head for discharging the ink, a metal member is used for constructing the flow passage portion for the ink in many cases. A problem has arisen such that the metal member is apt to be corroded because the metal member always makes contact with the ink containing the polyvalent metal salt.

SUMMARY OF THE INVENTION

The present invention has been made in order to solve the problems as described above, an object of which is to provide an ink set for ink-jet recording which reduces the color bleed at the adjoining portions of a black ink and a color ink and which does not cause the deposition of the dye or the like in the color ink even when a plurality of colors are recorded on regular paper. Another object of the present invention is to provide an ink-jet recording apparatus which accommodates the ink set of the present invention.

According to a first aspect of the present invention, there is provided an ink for ink-jet recording comprising:

an anionic dye; and at least one ethanolamine hydrochloride selected from the group consisting of monoethanolamine hydrochloride, diethanolamine hydrochloride, triethanolamine hydrochloride, and thioethanolamine hydrochloride. When the ink of the present invention is used together with an ink containing an anionicity-added pigment, the ethanolamine hydrochloride aggregates the anionicity-added pigment. Therefore, the color bleed is avoided at the adjoining portions of the inks. Further, pH is raised owing to the fact that the ethanolamine hydrochloride is contained. Therefore, the ink of the present invention prevents metal portions of the ink-jet recording apparatus from corrosion.

According to a second aspect of the present invention, there is provided an ink set for ink-jet recording comprising:

a first ink which contains an anionicity-added pigment; and a second ink which contains an anionic dye and at least one ethanolamine hydrochloride selected from the group consisting of monoethanolamine hydrochloride, diethanolamine hydrochloride, triethanolamine hydrochloride, and thioethanolamine hydrochloride. When the ink-jet recording is performed by using the ink set of the present invention, the ethanolamine hydrochloride, which is contained in the second ink, aggregates the anionicity-added pigment which is contained in the first ink. Accordingly, the color bleed is avoided at the adjoining portions of the inks. Therefore, for example, when the ink-jet recording is performed by using the first ink as a black ink and using the second ink as a color ink, an extremely vivid color image is obtained.

According to a third aspect of the present invention, there is provided an ink-jet recording apparatus comprising:

an ink-jet head;

an ink tank which accommodates an ink to be supplied to the ink-jet head; and an ink set according to the second aspect which is accommodated in the ink tank. The ink tank may includes a compartment in which the first and second inks are separately accommodated. The ink tank may be an ink container fixedly provided in the ink-jet recording apparatus or an ink cartridge which is replaceable. The second ink prevents metal portions of the ink-jet recording apparatus, for example, an ink flow passage from corrosion.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
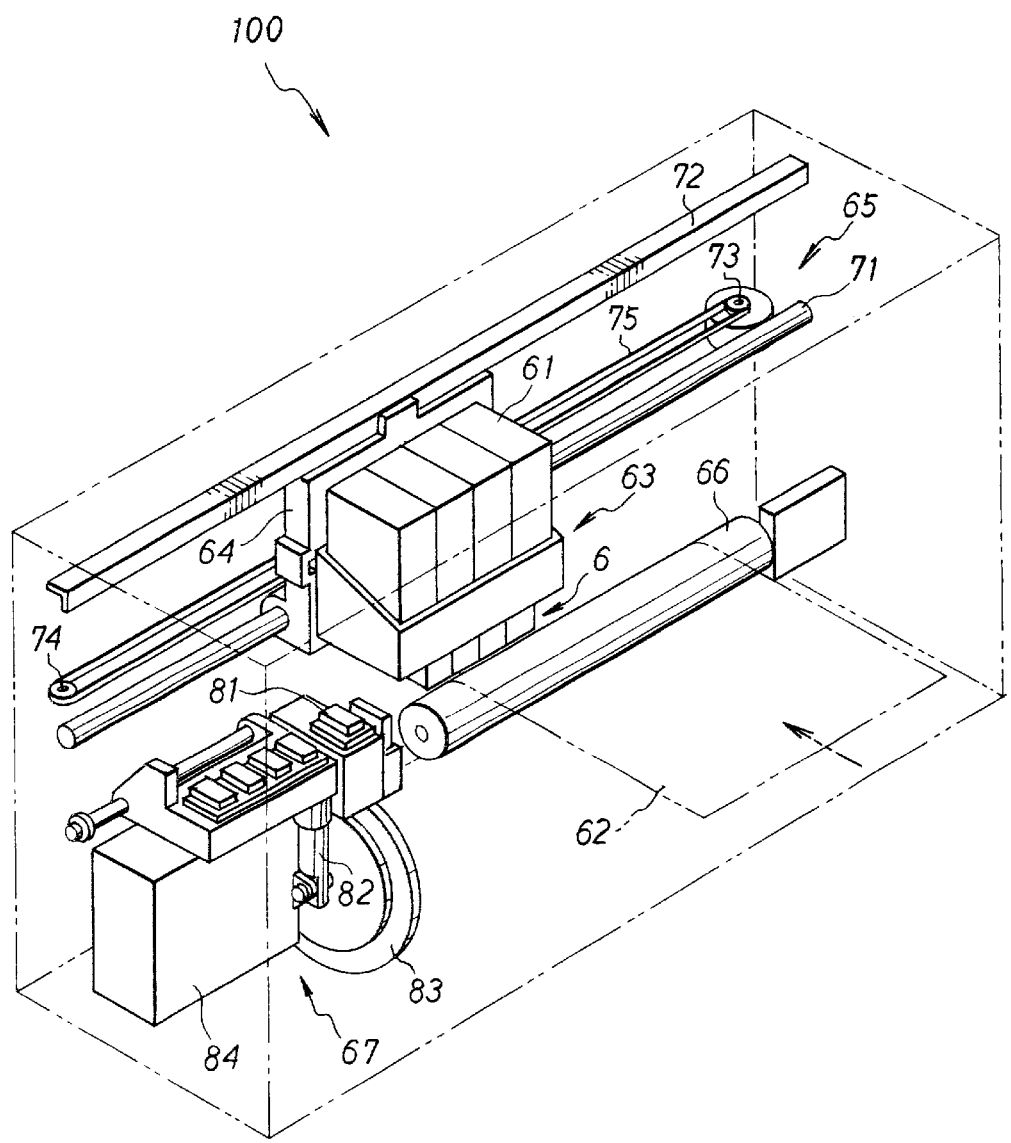
FIG. 1 is a perspective view showing a color ink-jet printer having an ink cartridge which contains color ink prepare in examples of the invention.

The present invention will be explained in detail below. The ink set for ink-jet recording of the present invention is composed of inks having a plurality of colors, which contains at least one of the first ink and at least one of the second ink respectively, or which may contain a plurality of them respectively, if necessary.

The first ink contains at least one anionicity-added pigment. The anionicity-added pigment may be exemplified, for example, by pigments added with water dispersibility by anionic polymer and/or anionic surfactant, and pigments added with water dispersibility by being applied with a chemical treatment to comprise carboxylated and/or sulfonated functional group on the surface.

When the present invention is used in order to reduce the color bleed at the adjoining portions of the black ink and the color ink, it is preferable that the first ink is the black ink. The anionicity-added pigment to be used for the black ink is exemplified, for example, by carbon black. The anionicity-added pigment may be used for the color ink. In this case, the pigment to be used for the anionicity-added pigment includes, for example, azo pigment such as azo lake, insoluble azo pigment, condensed azo pigment, and chelate azo pigment; polycyclic pigment such as phthalocyanine pigment, perylene and perynone pigments, anthraquinone pigment, quinacridone pigment, dioxazine pigment, thioindigo pigment, isoindolinone pigment, and quinophthalone pigment; dye lake such as basic dye type lake and acidic dye type lake; organic pigment such as nitro pigment and nitroso pigment; and inorganic pigment such as titanium oxide and iron oxide-based pigment.

The carbon black is not specifically limited, for which known one may be used. However, for example, it is possible to preferably use carbon black pigments such as furnace black, lamp black, acetylene black, and channel black. Among them, those commercially available include, for example, No. 25, No. 33, No. 40, No. 47, No. 52, No. 900, No. 2300, MCF-88, MA600, MA7, MA8, and MA100 (produced by Mitsubishi Chemical Corporation); Color Black FW1, Color Black FW2, Color Black FW2V, Color Black FW18, Color Black FW200, Color Black S150, Color Black S160, Color Black S170, Printex 35, Printex 150T, Printex U, Printex V, Printex 140U, Printex 140V, Special Black 6, Special Black 5, Special Black 4A, and Special Black 4 (produced by Degussa); Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (produced by Columbia); and Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan, CAB-O-JET 300 Black, and CAB-O-JET 200 Black (produced by Cabot). Those usable as the anionicity-added pigment of the black ink may also include, for example, Titanium Black and magnetic fine particles of, for example, magnetite and ferrite. The anionicity-added pigment is added into the black ink usually by 1 to 10% by weight and preferably by 2 to 8% by weight.

The second ink contains at least one anionic dye. The anionic dye is exemplified, for example, by water-soluble anionic dyes which principally include direct dyes and acidic dyes.

When the present invention is used in order to reduce the color bleed at the adjoining portions of the black ink and the color ink, it is preferable that the second ink is the color ink. Performance such as vividness, water-solubility, stability, and light resistance is especially required for the anionic dye which is used as a coloring agent for the color ink, as the ink for the ink-jet recording system.

The anionic dye, which satisfies the performance as described above, is not specifically limited. However, those commercially available preferably include, for example, C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; and C. I. Acid Violet 49. The anionic dye may be used singly, or two or more of the anionic dyes may be used in combination.

It is preferable that the anionic dye is used in an amount of 0.1 to 20% by weight with respect to the second ink. If the amount is less than 0.1% by weight, it is impossible to sufficiently develop the color on the regular paper in some cases. If the amount exceeds 20% by weight, for example, problems arise such that the anionic dye is not dissolved in the second ink, and the viscosity is increased in some cases. The amount is more preferably 0.3 to 15% by weight, and much more preferably 0.5 to 10% by weight.

The second ink contains at least one ethanolamine hydrochloride which is selected from the group consisting of monoethanolamine hydrochloride, diethanolamine hydrochloride, triethanolamine hydrochloride, and thioethanolamine hydrochloride.

When the inks having mutually different colors are subjected to the recording adjacently on the regular paper, the both inks usually inflow into the adjoining inks. However, the present inventors have found out that the ethanolamine hydrochloride, which is selected from the group consisting of monoethanolamine hydrochloride, diethanolamine hydrochloride, triethanolamine hydrochloride, and thioethanolamine hydrochloride, generates ion having a polarity opposite to that of the anionicity-added pigment in the ink to make bonding to the anionicity-added pigment, and thus the dispersion state of the anionicity-added pigment consequently becomes unstable to cause aggregation, resulting in the decrease in liquidity or fluidity. Further, the present inventors have found out, on the basis of this phenomenon, that the inflow of the black ink into the color ink can be suppressed to reduce the color bleed by using the anionicity-added pigment for the pigment of the black ink and adding at least one of the ethanolamine hydrochlorides described above to the color ink. Thus, the present invention has been completed.

For example, when the black ink containing the anionicity-added pigment of the carbon black added with the water dispersibility and the color ink containing the triethanolamine hydrochloride are subjected to the recording adjacently, then triethanolamine ion is generated from the triethanolamine hydrochloride dissolved in the color ink, and the triethanolamine ion is ionically bonded to the carbon black. As a result, the inflow into the color ink is suppressed for the carbon black with the deteriorated fluidity due to the occurrence of the aggregation at the adjoining portions with respect to the color ink, and thus the color bleed is reduced. On the other hand, the color ink inflows into the black ink. However, even when the color ink, which has the relatively bright color, inflows into the black portion, it is difficult to make distinction. Therefore, no problem arises.

It is preferable that monoethanolamine hydrochloride, diethanolamine hydrochloride, triethanolamine hydrochloride, and/or thioethanolamine hydrochloride is added in an amount of 0.1 to 5% by weight with respect to the whole of the second ink. If the amount is less than 0.1% by weight, it is impossible to exhibit any sufficient effect in some cases. If the amount exceeds 5% by weight, then the viscosity of the ink is increased, any solid matter is deposited at the nozzle outlet, and the nozzle tends to be clogged in some cases. The amount is more preferably 0.5 to 4% by weight, and much more preferably 1 to 3% by weight. The ethanolamine hydrochloride may be used singly, or two or more of the ethanolamine hydrochlorides may be used in combination. However, even when two or more of the ethanolamine hydrochlorides are used in combination, the ratio thereof in the whole second ink is the same as the ratio adopted when one ethanolamine hydrochloride is added.

The solvent for the ink to be used in the present invention is not specifically limited. However, the solvent is preferably water. A water-soluble organic solvent can be also used in a mixed manner. It is preferable to use water having high purity such as ion exchange water and distilled water, rather than ordinary water.

The water-soluble organic solvent includes, for example, alkyl alcohols having a number of carbon or carbons of 1 to 5 such as methyl alcohol, ethyl alcohol, propyl alcohol, and butyl alcohol; amides such as dimethylformamide and dimethylacetamide; ketones or ketone alcohols such as acetone and diacetone alcohol; ethers such as tetrahydrofuran and dioxane; alkylene glycols with alkylene group having a number of carbons of 2 to 6 such as glycerol, ethylene glycol, propylene glycol, triethylene glycol, and diethylene glycol; polyalkylene glycols such as polyethylene glycol and polypropylene glycol; sulfolane, pyrrolidone, methyl-2-pyrrolidone, 1,3-dimethyl-2-imidazolidinone, and 1,5-pentanediol. The blending ratio of the water-soluble organic solvent is determined in a wide range depending on the composition of the ink or the desired characteristics of the ink.

Polyoxyalkylene glycol-n-alkyl ether can be contained in the ink to be used in the present invention in order to control the penetration or permeation. It is preferable for the polyoxyalkylene glycol-n-alkyl ether described above that the number of carbon or carbons of the alkyl group is not more than 5, and the number of carbon or carbons of the oxyalkylene group is not more than 12. Those having a long molecular chain result in extreme increase in viscosity, which are not suitable for the material for the ink for ink-jet recording.

The polyoxyalkylene glycol-n-alkyl ether is exemplified, for example, by glycol ethers represented by alkyl ethers based on ethylene glycol and propylene glycol.

The glycol ether based on ethylene glycol may specifically include, for example, ethylene glycol-n-methyl ether, ethylene glycol-n-ethyl ether, ethylene glycol-n-propyl ether, ethylene glycol-n-butyl ether, ethylene glycol-n-isobutyl ether, diethylene glycol-n-methyl ether, diethylene glycol-n-ethyl ether, diethylene glycol-n-propyl ether, diethylene glycol-n-butyl ether, diethylene glycol-n-isobutyl ether, triethylene glycol-n-methyl ether, triethylene glycol-n-ethyl ether, triethylene glycol-n-propyl ether, triethylene glycol-n-butyl ether, and triethylene glycol-n-isobutyl ether.

The glycol ether based on propylene glycol may specifically include, for example, propylene glycol-n-methyl ether, propylene glycol-n-ethyl ether, propylene glycol-n-propyl ether, propylene glycol-n-isopropyl ether, propylene glycol-n-butyl ether, dipropylene glycol-n-methyl ether, dipropylene glycol-n-ethyl ether, dipropylene glycol-n-propyl ether, dipropylene glycol-n-isopropyl ether, dipropylene glycol-n-butyl ether, tripropylene glycol-n-methyl ether, tripropylene glycol-n-ethyl ether, tripropylene glycol-n-propyl ether, and tripropylene glycol-n-isopropyl ether.

The ink set for ink-jet recording of the present invention is basically constructed as described above. Additionally, the ink set for ink-jet recording of the present invention may optionally contain, for example, hitherto known various types of dispersing agents, surfactants, viscosity-adjusting agents, surface tension-adjusting agents, pH-adjusting agents, antiseptic agents, and fungicides. When the ink set for ink-jet recording of the present invention is applied to an ink-jet system of the type in which the ink is discharged by the action of the thermal energy, for example, thermal physical property values such as those of the specific heat, the coefficient of thermal expansion, and the coefficient of thermal conductivity are adjusted in some cases.

As described above, in the ink set for ink-jet recording of the present invention, the problems involved in the conventional technique are sufficiently dissolved. The color bleed in the ink-jet system can be reduced without causing, for example, the deposition of the dye. Therefore, it is possible to effect the vivid color recording even on the regular paper.

The present invention will be explained in further detail below as exemplified by examples. However, the present invention is not limited to only the examples.

EXAMPLE 1

Inks having the following compositions were prepared. As for a black ink pigment, a mill base was previously prepared. The amounts of glycerol and pure water were adjusted with respect to the mill base to formulate the designed ink composition.

Composition of Black Ink

Pigment (MA 100 produced by Mitsubishi Chemical Corporation): 5% by weight;

Anionic dispersing agent (Dysperbyk 190 produced by BYK Chemie): 0.7% by weight;

Glycerol: 25% by weight;

Triethylene glycol-n-butyl ether: 2% by weight;

Pure water: 67.3% by weight.

Composition of Cyan Ink
  Triethanolamine hydrochloride: 3% by weight;
  C. I. Direct Blue 199: 2% by weight;
  Glycerol: 27% by weight;
  Triethylene glycol-n-butyl ether: 2% by weight;
  Pure water: 66% by weight.
Composition of Magenta Ink
  Triethanolamine hydrochloride: 3% by weight;
  C. I. Direct Red 227: 2% by weight;
  Glycerol: 29% by weight;
  Triethylene glycol-n-butyl ether: 2% by weight;
  Pure water: 64% by weight.
Composition of Yellow Ink
  Triethanolamine hydrochloride: 3% by weight;
  C. I. Direct Yellow 142: 2% by weight;
  Glycerol: 25% by weight;
  Triethylene glycol-n-butyl ether: 2% by weight;
  Pure water: 68% by weight.

EXAMPLE 2

A mill base was prepared in the same manner as in Example 1, and the mill base was used as a material for a black ink.
Composition of Black Ink
  Pigment (Printex 150T produced by Degussa): 5% by weight;
  Anionic dispersing agent (Dysperbyk 190 produced by BYK Chemie): 0.7% by weight;
  Glycerol: 25% by weight;
  Triethylene glycol-n-butyl ether: 2% by weight;
  Pure water: 67.3% by weight.
Composition of Cyan Ink
  The composition was the same as the composition of the cyan ink in Example 1.
Composition of Magenta Ink
  The composition was the same as the composition of the magenta ink in Example 1.
Composition of yellow Ink
  The composition was the same as the composition of the yellow ink in Example 1.

EXAMPLE 3

A mill base was prepared in the same manner as in Example 1, and the mill base was used as a material for a black ink.
Composition of Black Ink
  Pigment (Monarch 880 produced by Cabot): 5% by weight;
  Anionic dispersing agent (Dysperbyk 190 produced by BYK Chemie): 0.7% by weight;
  Glycerol: 25% by weight;
  Triethylene glycol-n-butyl ether: 2% by weight;
  Pure water: 67.3% by weight.
Composition of Cyan Ink
  The composition was the same as the composition of the cyan ink in Example 1.
Composition of Magenta Ink
  The composition was the same as the composition of the magenta ink in Example 1.
Composition of Yellow Ink
  The composition was the same as the composition of the yellow ink in Example 1.

EXAMPLE 4

Composition of Black ink
  Pigment (CAB-O-JET 300 produced by Cabot): 33% by weight;
  Glycerol: 25% by weight;
  Triethylene glycol-n-butyl ether: 2% by weight;
  Pure water: 40% by weight.
Composition of Cyan Ink
  The composition was the same as the composition of the cyan ink in Example 1.
Composition of Magenta Ink
  The composition was the same as the composition of the magenta ink in Example 1.
Composition of Yellow Ink
  The composition was the same as the composition of the yellow ink in Example 1.

EXAMPLE 5

Composition of Black Ink
  Pigment (CAB-O-JET 300 produced by Cabot): 33% by weight;
  Polyethylene glycol (average molecular weight: 200): 22% by weight;
  Triethylene glycol-n-butyl ether: 2% by weight;
  Pure water: 43% by weight.
Composition of Cyan Ink
  Thioethanolamine hydrochloride: 5% by weight;
  C. I. Acid Blue 9: 2% by weight;
  Polyethylene glycol (average molecular weight: 200): 25% by weight;
  Triethylene glycol-n-butyl ether: 2% by weight;
  Pure water: 66% by weight.
Composition of Magenta Ink
  Thioethanolamine hydrochloride: 5% by weight;
  C. I. Acid Red 52: 2% by weight;
  Polyethylene glycol (average molecular weight: 200): 27% by weight;
  Triethylene glycol-n-butyl ether: 2% by weight;
  Pure water: 64% by weight.
Composition of Yellow Ink
  Thioethanolamine hydrochloride: 5% by weight;
  C. I. Acid Yellow 23: 2% by weight;
  Polyethylene glycol (average molecular weight: 200): 23% by weight;
  Triethylene glycol-n-butyl ether: 2% by weight;
  Pure water: 68% by weight.

EXAMPLE 6

Composition of Black Ink
  Pigment (CAB-O-JET 200 produced by Cabot): 25% by weight;
  Polyethylene glycol (average molecular weight: 200): 23% by weight;
  Triethylene glycol-n-butyl ether: 2% by weight;
  Pure water: 50% by weight.
Composition of Cyan ink
  Monoethanolamine hydrochloride: 1% by weight;
  Diethanolamine hydrochloride: 2% by weight;
  C. I. Direct Blue 199: 2% by weight;
  Glycerol: 28% by weight;
  Triethylene glycol-n-butyl ether: 2% by weight;
  Pure water: 65% by weight.
Composition of Magenta Ink
  Monoethanolamine hydrochloride: 1% by weight;
  Diethanolamine hydrochloride: 2% by weight;
  C. I. Direct Red 227: 2% by weight;
  Glycerol: 30% by weight;
  Triethylene glycol-n-butyl ether: 2% by weight;
  Pure water: 63% by weight.
Composition of Yellow Ink
  Monoethanolamine hydrochloride: 1% by weight;
  Diethanolamine hydrochloride: 2% by weight;

C. I. Direct Yellow 142: 2% by weight;
Glycerol: 26% by weight;
Triethylene glycol-n-butyl ether: 2% by weight;
Pure water: 67% by weight.

COMPARATIVE EXAMPLE 1

The black ink had the same composition as the composition used in Example 1. As for the cyan ink, the magenta ink, and the yellow ink, inks were prepared in the same manner as in Example 1 except that the amount of pure water was adjusted for each of them so that the total amount was 100% by weight without adding the triethanolamine hydrochloride.

COMPARATIVE EXAMPLE 2

Inks were prepared in the same manner as in Example 2 except that C. I. Direct Black 154 was added by 2% by weight in place of the pigment (Printex 150T produced by Degussa) and the anionic dispersing agent (Dysperbyk 190 produced by BYK Chemie), and the amount of pure water was adjusted so that the total amount was 100% by weight.

COMPARATIVE EXAMPLE 3

Inks were prepared in the same manner as in Example 3 except that C. I. Direct Black 19 was added by 2% by weight in place of the pigment (Monarch 880 produced by Cabot) and the anionic dispersing agent (Dysperbyk 190 produced by BYK Chemie), the amount of pure water was adjusted so that the total amount was 100% by weight, and the amount of pure water was adjusted so that the total amount was 100% by weight for each of the cyan ink, the magenta ink, and the yellow ink without adding the triethanolamine hydrochloride.

Evaluation of Performance

The respective materials were sufficiently mixed and agitated for the ink sets for ink-jet recording of Examples 1 to 6 and Comparative Examples 1 to 3 respectively, followed by performing filtration with a membrane filter of 0.8 µm to use the obtained ink sets for the evaluation of recording.

The recording was performed with the ink sets for ink-jet recording by using an ink-jet printer having a multi-head of the on-demand type (discharge orifice diameter: 35 µm, resistance value of heating resistor: 150 Ω, driving voltage: 30 V, frequency: 2 kHz) for performing the recording by discharging droplets by applying the thermal energy to the ink in the recording head. The recording was performed by combining the black ink and the color ink so that the letter color and the background color were obtained respectively on recording samples. The evaluation was directed to the color bleed at the boundary at which the colors were mixed with each other and to the distinction of symbols. Circular symbols and square symbols were recorded with each of the colors without any background to obtain a recording sample to serve as the evaluation standard. As for the dimension of the recorded symbols, the size was set to 11 point with Microsoft Word 97. The recording was performed on the regular paper (Xerox 4200).

The method for evaluating the recording sample is shown below. The evaluation was performed visually for the degree of the occurrence of the color bleed in the recording sample with the background as compared with the recording sample subjected to the recording with no background. The evaluation criterion is as follows:

++: the color bleed is scarcely observed, and the equivalent vividness is obtained as compared with the symbols with no background;

+: the color bleed is slightly generated as compared with the symbols with no background, but the symbols are sufficiently distinguishable;

±: the color bleed is clearly generated as compared with the symbols with no background, but the symbols are distinguishable; and −: the color bleed is clearly generated as compared with the symbols with no background, and the symbols are difficult to be distinguished as well.

*: the printing experiment was stopped.

Table 1 shows obtained results.

TABLE 1

| Letter x background | Example | | | | | | Comparative Example | | |
|---|---|---|---|---|---|---|---|---|---|
| | 1 | 2 | 3 | 4 | 5 | 6 | 1 | 2 | 3 |
| Black letter x cyan background | + | + | + | ++ | ++ | + | − | − | − |
| Black letter x magenta background | + | + | + | ++ | ++ | + | − | − | − |
| Black letter x yellow background | + | + | + | + | + | + | − | − | − |
| Cyan letter x black background | + | + | + | ++ | ++ | + | − | − | − |
| Magenta letter x black background | + | + | + | ++ | ++ | + | − | − | − |
| Yellow letter x black background | + | + | + | + | + | + | − | − | − |

As shown in Table 1, the recording, which was performed by using the ink set for ink-jet recording produced in each of Comparative Examples, brought about the indistinct printing results. On the other hand, the color bleed was suppressed, and the printing result was satisfactory in the recording based on the use of the ink set for ink-jet recording produced in each of Examples.

In the recording based on the use of the ink set for ink-jet recording produced in Comparative Example 1, the aggregation of the pigment was not caused when the black ink and the color ink were subjected to the recording adjacently, because the color ink did not contain any one of monoethanolamine hydrochloride, diethanolamine hydrochloride, triethanolamine hydrochloride, and thioethanolamine hydrochloride. As a result, it was impossible to reduce the color bleed.

In the recording based on the use of the ink set for ink-jet recording produced in Comparative Example 2, the aggregation of the pigment was not caused when the black ink and the color ink were subjected to the recording adjacently, because the coloring agent, which was not the anionicity-added pigment, was used in the black ink. As a result, it was impossible to reduce the color bleed.

In the recording based on the use of the ink set for ink-jet recording produced in Comparative Example 3, the aggregation of the pigment was not caused when the black ink and the color ink were subjected to the recording adjacently, because the coloring agent, which was not the anionicity-added pigment, was used in the black ink, and the color ink did not contain any one of monoethanolamine hydrochloride, diethanolamine hydrochloride, triethanolamine hydrochloride, and thioethanolamine hydrochloride. As a result, it was impossible to reduce the color bleed. In Examples, the inks were prepared, which contained monoethanolamine hydrochloride, triethanolamine hydrochloride, and thioethanolamine hydrochloride respectively. However, it has been revealed that the excellent color bleed-preventive effect is obtained in the same manner as in Examples described above even when the ink is prepared by using diethanolamine hydrochloride.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 to be returned to the reset position after printing.

Figure 2:
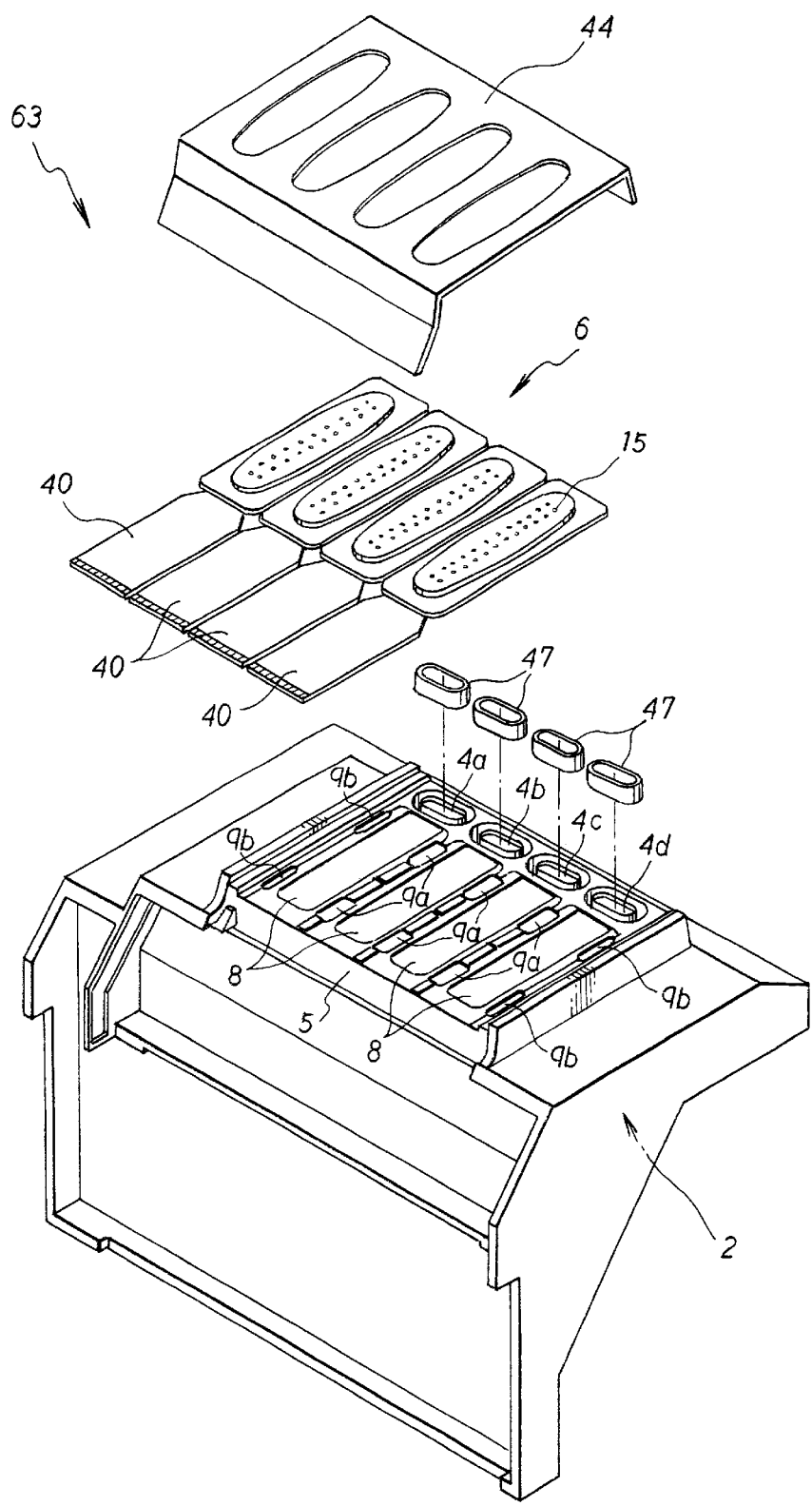
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are from to penetrate the bottom plate 5.

Figure 3:
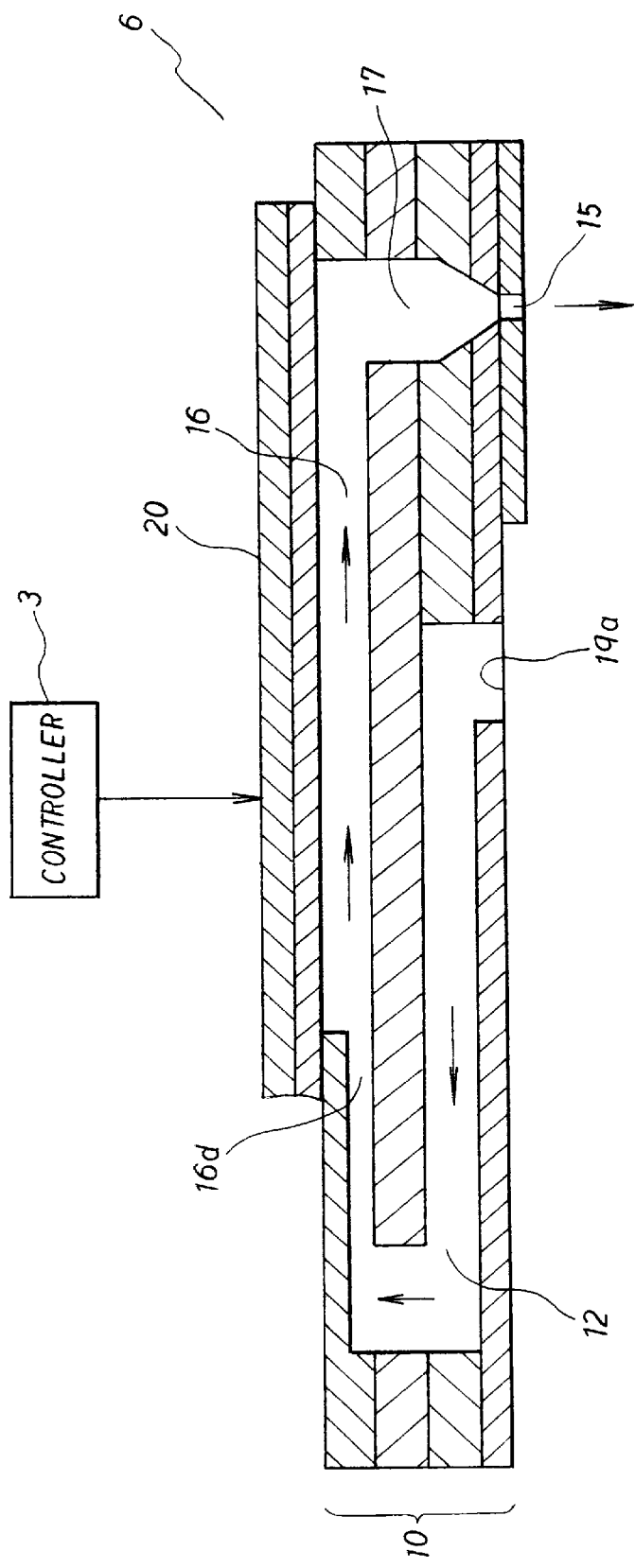
FIG. 3 is a schematic diagram showing the ink jet print head and a controller.

FIG. 3 is a sectional view showing one of the pressure chambers in the head 6. A plurality of pressure chambers 16 are provided in the head 6. The nozzle 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 and 6,460,959. Further, the detailed structure of the printer and controlling method of the head unit are also disclosed in the U.S. patents, a content of which has been incorporated by reference.

The present invention is constructed as described above. Therefore, it is possible to provide the ink set for ink-jet recording capable of performing vivid color recording in which the color bleed is reduced at the adjoining portions of the black ink and the color ink without causing, for example, any deposition of the dye in the color ink. When the ink and the ink set of the present invention are used, it is also possible to suppress the corrosion at the metal portion of the ink-jet recording apparatus.

What is claimed is:

1. An ink for ink-jet recording comprising:
   an anionic dye; and
   at least one ethanolamine hydrochloride selected from the group consisting of monoethanolamine hydrochloride, diethanolamine hydrochloride, triethanolamine hydrochloride, and thioethanolamine hydrochloride.

2. The ink for ink-jet recording according to claim 1, wherein the ethanolamine hydrochloride is contained in the ink by 0.1 to 5% by weight.

3. An ink set for ink-jet recording comprising:
   a first ink which contains an anionicity-added pigment; and
   a second ink which contains an anionic dye and at least one ethanolamine hydrochloride selected from the group consisting of monoethanolamine hydrochloride, diethanolamine hydrochloride, triethanolamine hydrochloride, and thioethanolamine hydrochloride.

4. The ink set for ink-jet recording according to claim 3, wherein the first ink is a black ink, and the second ink a color ink.

5. The ink set for ink-jet recording according to claim 3, wherein the ethanolamine hydrochloride is contained in the ink by 0.1 to 5% by weight.

6. The ink set for ink-jet recording according to claim 3, further comprising an ink cartridge, wherein each of the first ink and the second ink is accommodated in the ink cartridge.

7. An ink-jet recording apparatus comprising:
   an ink-jet head;

an ink tank which accommodates an ink to be supplied to the ink-jet head; and an ink set as defined in claim 3 which is accommodated in the ink tank.

8. The ink-jet recording apparatus according to claim 7, wherein the ethanolamine hydrochloride is contained in the ink by 0.1 to 5% by weight.

9. The ink-jet recording apparatus according to claim 7, wherein the ink tank is an ink cartridge.

10. An ink set for ink-jet recording comprising:

a first ink which contains an anionicity-added pigment; and a second ink which contains an anionic dye for the second ink and at least one ethanolamine hydrochloride selected from the group consisting of monoethanolamine hydrochloride, diethanolamine hydrochloride, triethanolamine hydrochloride, and thioethanolamine hydrochloride;

a third ink which contains an anionic dye for the third ink and at least one ethanolamine hydrochloride selected from the group consisting of monoethanolamine hydrochloride, diethanolamine hydrochloride, triethanolamine hydrochloride, and thioethanolamine hydrochloride; and a fourth ink which contains an anionic dye for the fourth ink and at least one ethanolamine hydrochloride selected from the group consisting of monoethanolamine hydrochloride, diethanolamine hydrochloride, triethanolamine hydrochloride, and thioethanolamine hydrochloride.

11. The ink set for ink-jet recording according to claim 10, wherein the first ink is a black ink, and the second ink a color ink.

12. The ink set for ink-jet recording according to claim 10, wherein the ethanolamine hydrochloride is contained in the ink by 0.1 to 5% by weight.

13. The ink set for ink-jet recording according to claim 10, further comprising an ink cartridge, wherein each of the first ink and the second ink is accommodated in the ink cartridge.

14. The ink set for ink-jet recording according to claim 10, wherein the second comprises a glycerol.

15. The ink set for ink-jet recording according to claim 10, wherein the second ink comprises a polyoxyalkylene glycol-n-alkyl ether.

16. The ink set for ink-jet recording according to claim 10, wherein the polyoxyalkylene glycol-n-alkyl ether is triethylene glycol-n-butyl ether.

17. The ink set for ink-jet recording according to claim 16, wherein the second ink is a cyan ink, third ink is a magenta ink and the fourth is a yellow ink.

18. An ink-jet recording apparatus comprising:

an ink-jet head;

an ink tank which accommodates an ink to be supplied to the ink-jet head; and an ink set as defined in claim 10 which is accommodated in the ink tank.

19. The ink-jet recording apparatus according to claim 18, wherein the ethanolamine hydrochloride is contained in the ink by 0.1 to 5% by weight.

20. The ink-jet recording apparatus according to claim 18, wherein the ink tank is an ink cartridge.

\* \* \* \* \*